Figure 6:
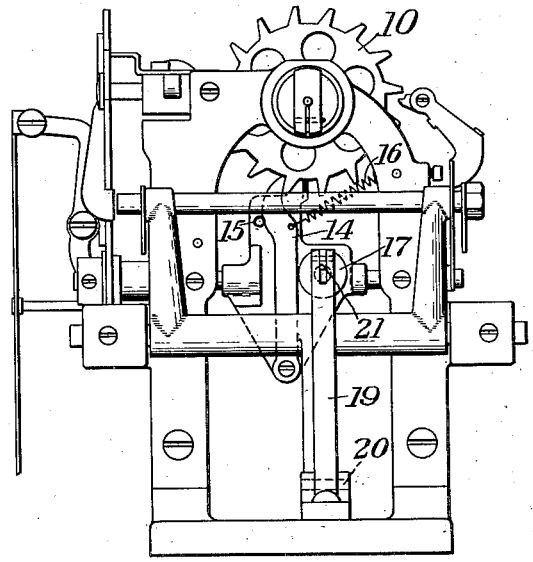

April 26, 1932. P. W. SHIELDS 1,855,845
TYPEWRITER
Filed Aug. 19, 1926 6 Sheets-Sheet 1
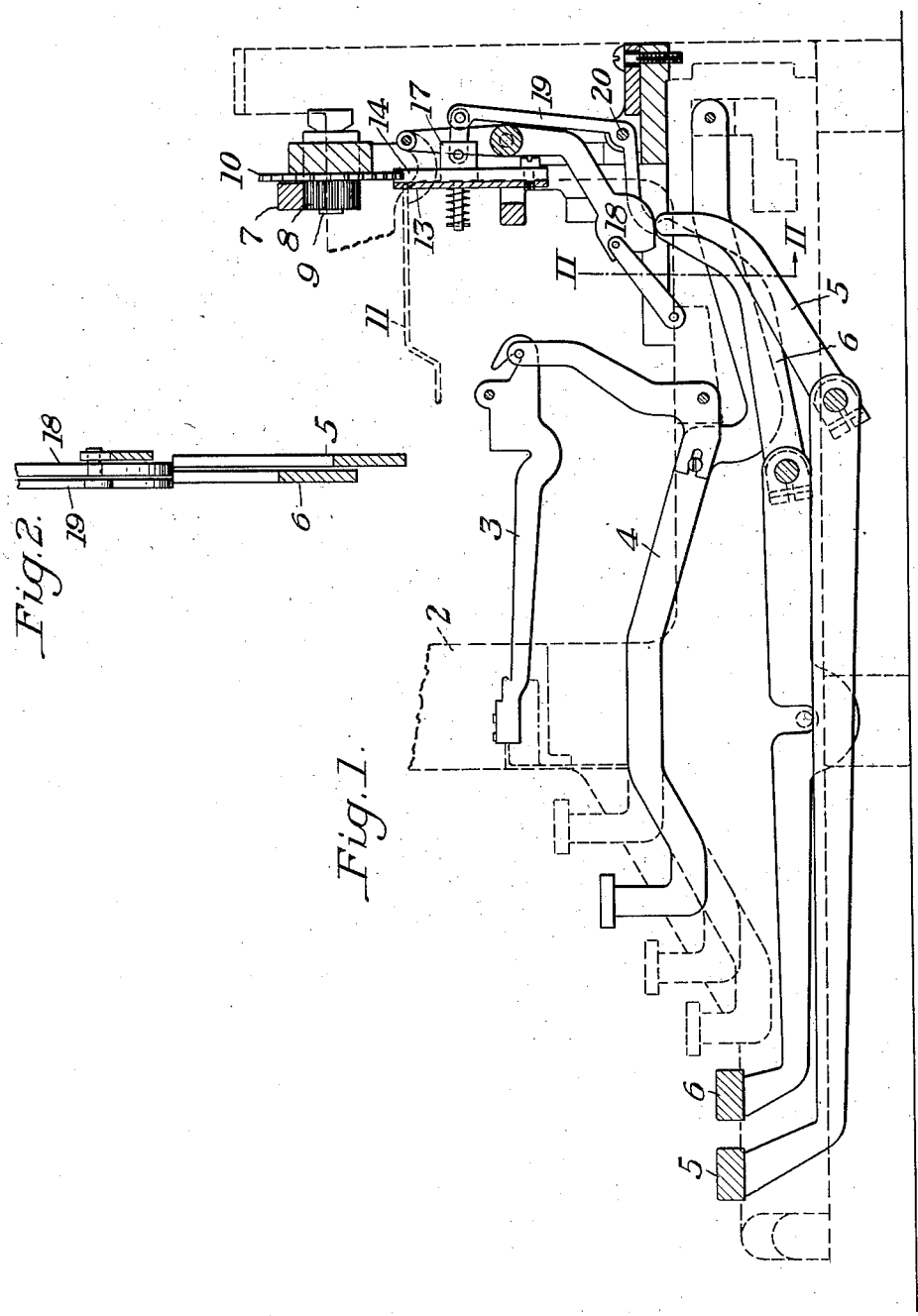
INVENTOR
Patrick W. Shields
by his attys.
Byrnes, Stebbins & Parmelee

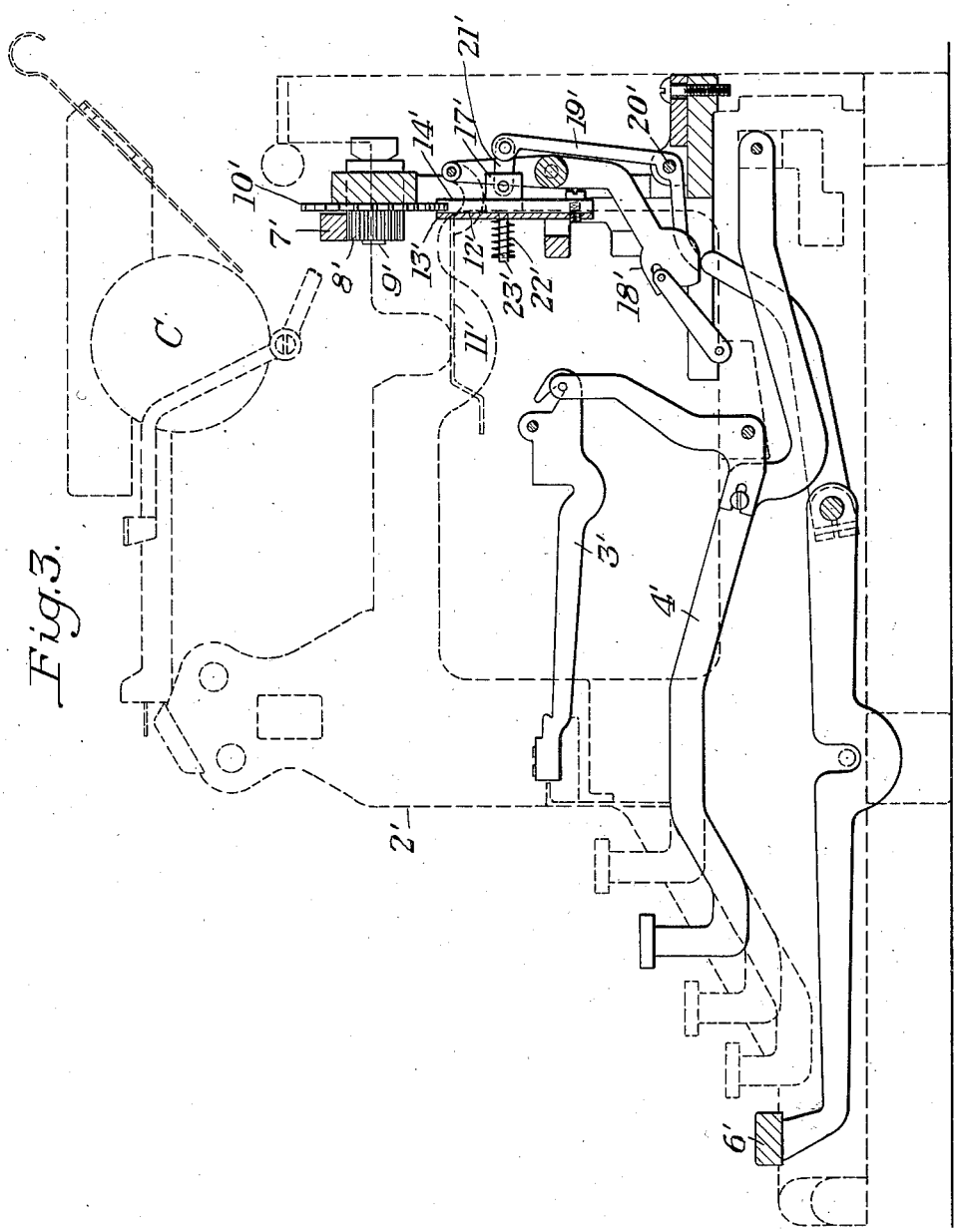

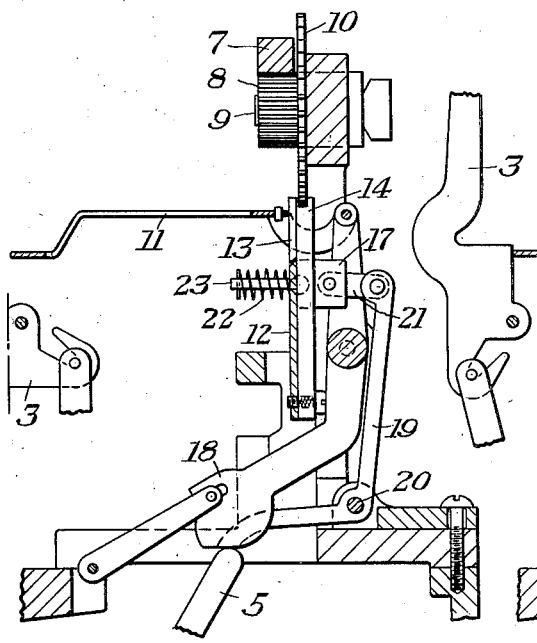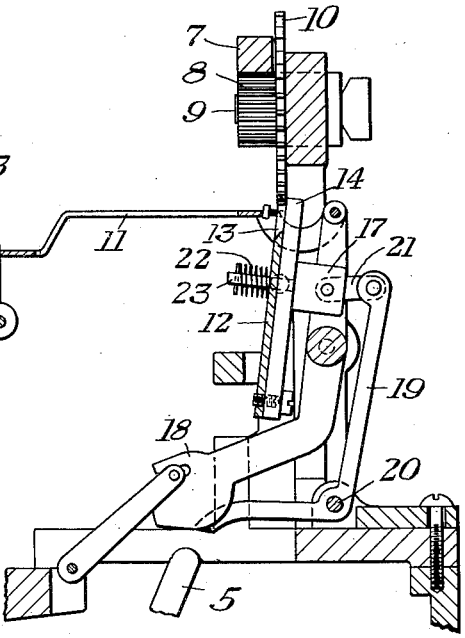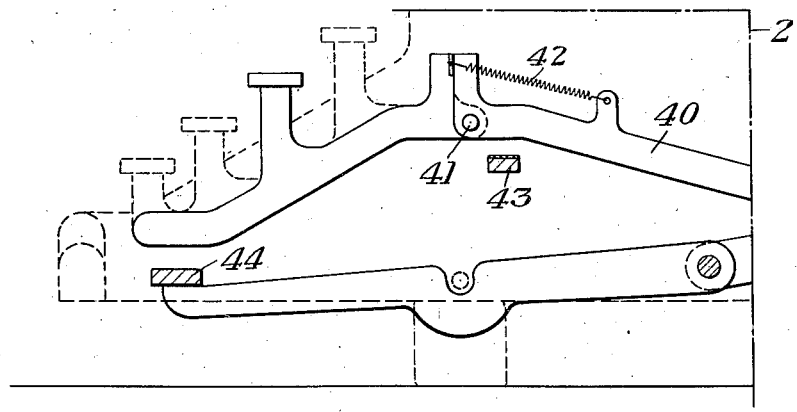

April 26, 1932. P. W. SHIELDS 1,855,845
TYPEWRITER
Filed Aug. 19, 1926 6 Sheets-Sheet 5
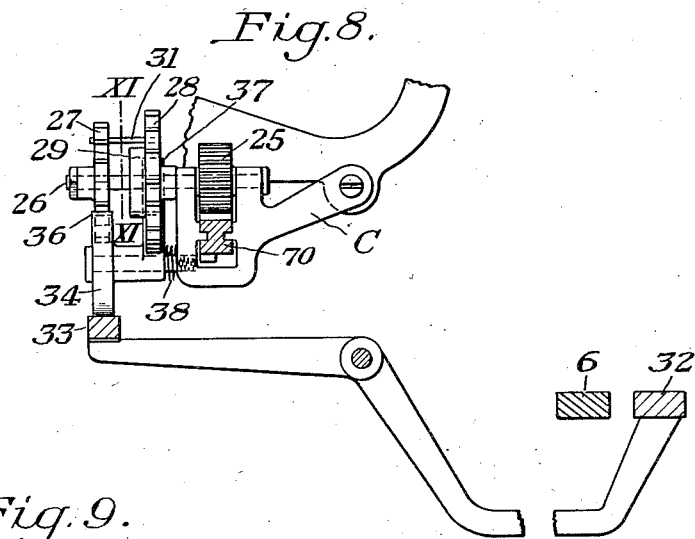
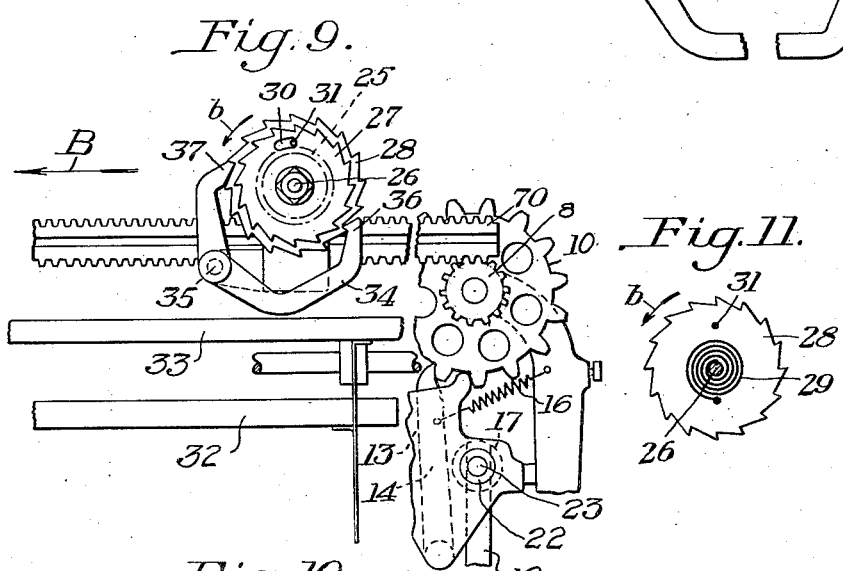
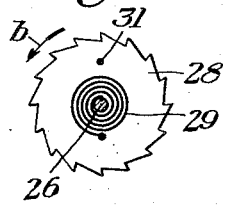
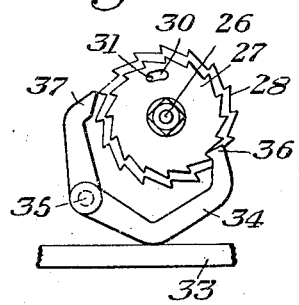
INVENTOR
Patrick W. Shields April 26, 1932.   P. W. SHIELDS   1,855,845
TYPEWRITER
Filed Aug. 19, 1926   6 Sheets-Sheet 6
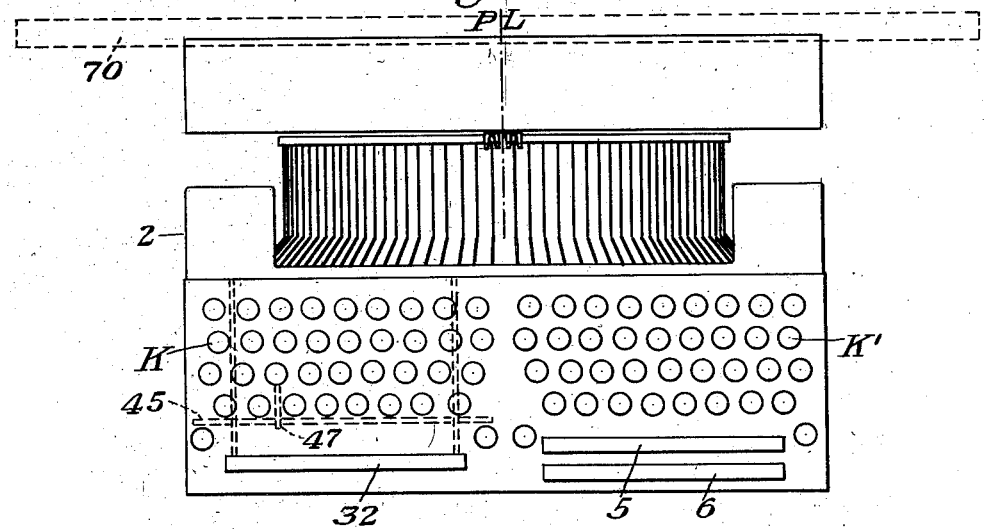
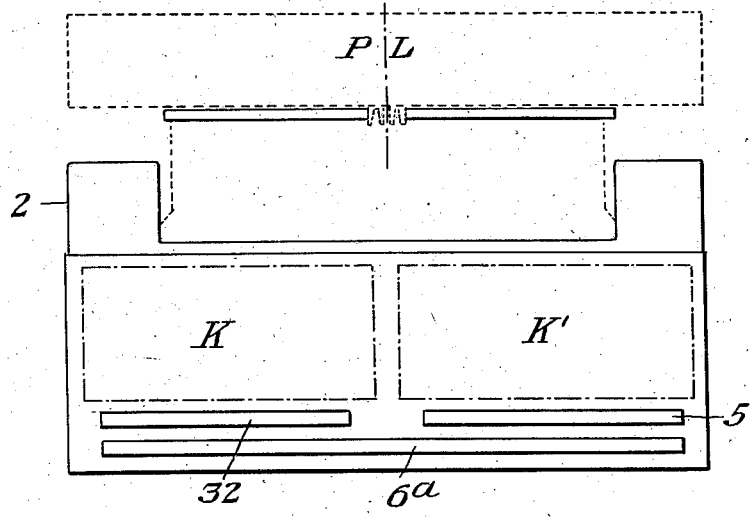
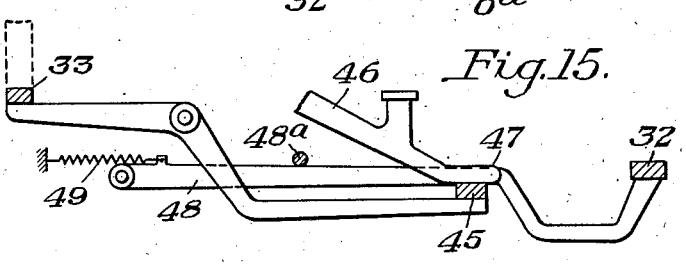
INVENTOR Patented Apr. 26, 1932

1,855,845

UNITED STATES PATENT OFFICE

PATRICK W. SHIELDS, OF PITTSBURGH, PENNSYLVANIA

TYPEWRITER

Application filed August 19, 1926. Serial No. 130,135.

The present invention relates broadly to typewriters, and more particularly to improved typewriting mechanism by means of which desirable results with respect to spacing and combinations of spacing may be obtained.

It has heretofore been proposed in the art to which this invention relates, to construct so-called double or twin typewriter units having a double keyboard. With such constructions it has been possible to print two letters simultaneously, each letter having the faculty of effecting a double spacing. This has made it necessary, as a matter of practice when operating such units, to print from first one key board and then the other, if for any reason it was desired to strike the keys individually.

It is one of the objects of the present invention to provide improved mechanism adaptable for use with double typewriters whereby printing may be accomplished from the type controlled by the two keyboards simultaneously or whereby either of the keyboards can, if so desired, be used to the exclusion of the other by having each key effect a single spacing operation instead of a double operation as heretofore proposed.

Another object of the present invention is to provide an improved mechanism adaptable for use with single keyboard typewriters of standard construction, whereby an operator may, at will, effect either a single spacing as is now customary, a double spacing, or a triple spacing.

Another object of the present invention is to provide a typewriter having a plurality of independent escapement mechanisms controlling the carriage movement whereby it is possible to operate either escapement individually or the different escapements simultaneously. Such a construction lends itself to the simultaneous striking of a letter and a suitable control, such for example as a space bar, whereby not only is the letter printed but spacing is simultaneously accomplished, thereby preparing the machine for continued operation without the necessity of a separate striking of the space bar as heretofore required.

Another object of the present invention is to provide an improved escapement mechanism embodying separate units adapted to be individually or simultaneously controlled and capable of effecting the simultaneous printing of a character and the production of a single space, a double space, or a triple space, as desired.

Still another object of the present invention is to provide a typewriter of such nature that the time heretofore required for the operation of the space bar at the conclusion of words, sentences or the like may be saved, and the space bar actuated concomitantly with the actuation of the last character of a word or sentence.

In the accompanying drawings there are shown more or less diagrammatically, and for purposes of illustration only, certain preferred embodiments of the present invention, it being understood that the drawings do not define the limits of my invention as changes in the construction and operation disclosed therein may be made without departing either from the spirit of the present invention or the scope of my broader claims.

Figure 7:
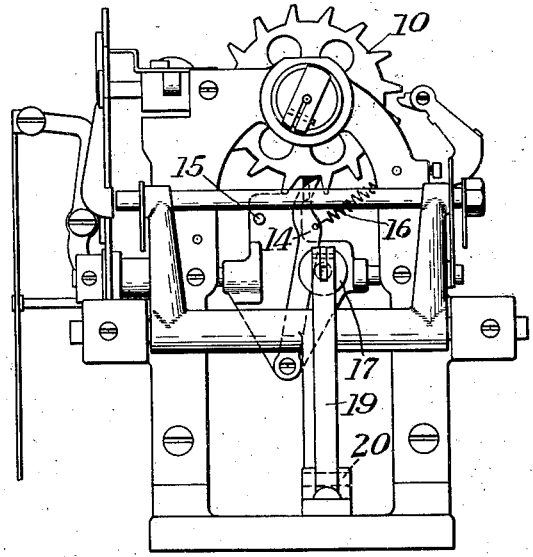

In the drawings:

Figure 1 is a partial vertical sectional view through a portion of a typewriter constructed in accordance with the present invention, Figure 2 is a detail sectional view, on an enlarged scale, on the line II—II of Figure 1, Figure 3 is a view similar to Figure 1 illustrating a slightly modified embodiment of the present invention, Figure 4 is a vertical sectional view through a portion of the escapement mechanism showing the parts in normal position, Figure 5 is a view similar to Figure 4 showing the parts in the position which they assume during a printing operation, Figure 6 is a rear elevational view of the escapement mechanism with the parts in the position shown in Figure 4, Figure 7 is a rear elevational view of the escapement mechanism with the parts shown in the position of Figure 5, Figure 8 is a detail sectional view illustrating a supplemental escapement mechanism, Figure 9 is a rear elevational view of the mechanism shown in Figure 8, Figure 10 is a detail view of a portion of the escapement mechanisms of Figures 8 and 9, showing the parts in the position which they assume during a spacing operation but before the completion thereof, Figure 11 is a vertical sectional view on the line XI—XI of Figure 8, Figure 12 is a partial view through a portion of a typewriter showing a modified embodiment of the invention, Figure 13 is a diagrammatic view showing the invention applied to a double or twin typewriter, Figure 14 is a diagrammatic view illustrating still another arrangement of space bars, and Figure 15 is a diagrammatic view showing a preferred space lever arrangement.

In carrying out the present invention it may be desirable to adapt the same to a standard typewriting machine having a single space bar and so construct the mechanism that either the ordinary printing operation or the ordinary spacing operation may be obtained. In other cases it is desirable to so construct the mechanism that the foregoing results are obtainable as well as a double spacing operation, such results, together with the double spacing operation being obtainable either individually or simultaneously.

In Figure 1 of the drawings there is illustrated a machine of standard construction having my invention applied thereto in such manner that the machine may be operated in accordance with present day operation or whereby it may be operated to effect a double spacing operation by itself, or a printing and a single spacing operation simultaneously.

Referring more particularly to Figures 1, 2, 4, 5, 6, and 7 of the drawings, there is illustrated a frame 2 of suitable construction having mounted therein a plurality of type bars 3, as well understood in the art. Each of these type bars is adapted to be operated by a key lever 4 operatively connected thereto in known manner. The frame is also shown as being provided with a space bar 5 of standard construction adapted to effect an individual or single spacing operation, and with a supplemental space bar 6 adapted to effect a double spacing operation when struck independently, or a single spacing operation when struck simultaneously with the printing of a character, the single spacing being supplemental to the spacing effected by such printing operation.

The escapement mechanism, by means of which these results are obtained is illustrated in detail in Figures 2 and 4 to 6, both inclusive. In these figures there is shown the rack bar 7 usually provided in standard typewriter structures for controlling the movement of the carriage. This rack bar is illustrated as cooperating with a pinion 8, by means of which its movement is regulated. Carried by the shaft 9 on which the pinion 8 is mounted is an escapement wheel 10. In Figures 1, 4, and 6 of the drawings, the parts are shown in the normal position which they occupy when the machine is at rest. Upon operation of a key, its corresponding type bar 3 is thrown to the position illustrated in Figure 5, in which position it engages the vibrator actuating bar 11 operatively connected to the compound vibrator 12. This vibrator comprises a holding pawl 13 and a release pawl 14. Normally the release pawl 14 is in engagement with one of the teeth of the escapement wheel 10 whereby movement of the escapement wheel is prevented. The exact position assumed by the release pawl 14 at such times is controlled by a stop 15 of any usual type; this stop preferably being adjustable for varying the normal position assumed by the release pawl. Upon operation of the vibrator actuating bar, the release pawl 14 is moved out of engagement with the escapement wheel, and the holding pawl 13 brought into operative position. When moved out of engagement with the wheel, the release pawl 14 is drawn to the right as viewed in Figures 6 and 7, by the spring 16, into the position shown in Figure 7. Movement in this direction is limited by a stop 17 described in detail hereinafter, the construction of the stop 17 being such that upon the return movement of the pawl 14 the desired rotation of the escapement wheel and consequent travel of the carriage will be obtained. Upon release of the key lever, the parts return to the position shown in Figure 1. During this return movement, the holding pawl 13 is moved to inoperative position and the release pawl 14 is moved to operative position. As it moves to operative position, it engages a new tooth on the escapement wheel, and under the influence of the carriage spring permits the escapement wheel to rotate until the release pawl again engages the stop 15.

Cooperating with the vibrator actuating bar 11 is any usual form of ribbon feeding and controlling mechanism 18 constituting no essential part of the present invention.

When it is desired to effect an ordinary spacing operation, the space bar 5 is depressed. This movement is effective through the ribbon mechanism 18 for moving the escapement pawl in a manner exactly similar to that before described whereby a single spacing operation without any printing is obtained.

If, for any reason, it should be desired to obtain a double spacing without any printing, the space bar 6 is depressed. This space bar at its rear end engages one arm of a bell crank lever 19 and rocks it about its pivotal mounting 20 in a clockwise direction as viewed in Figures 1, 4 and 5. This movement of the bell crank lever is effective through the link 21 for drawing the stop 17 outwardly against the action of the spring 22. In its outer position the enlarged portion of the stop is moved to such a point that it will not be effective for engaging the release pawl 14, the release pawl consequently being free to move until it engages the stem portion 23 of the stop. The difference between the diameter of the enlarged head on the stop 17 and the diameter of the stem 23 is such that the release pawl 14 may move to the right a sufficient distance to permit it to freely pass one of the teeth on the escapement wheel and engage the next tooth therebeyond. By reason of this construction, upon the return of the escapement mechanism to its normal position, a movement of the escapement wheel 10 through just twice its normal distance will be obtained, thereby resulting in a double spacing of the carriage.

In the event the space bar 6 is depressed simultaneously with the actuation of a key, it is obvious that not only will the ordinary spacing effected by the key be obtained, but also a supplemental space by reason of the withdrawal of the stop 17. For example, if the period key is depressed simultaneously with the depression of the space bar 6, upon the release of the parts the carriage will be in a position to permit the typing of a new word with the first letter of that word a distance of one space from the period. Obviously, if additional spacing is required the single space bar 5 or the double space bar 6 can be separately operated at any time.

In Figure 3, there is illustrated a slightly modified embodiment of the invention in which parts corresponding to the parts already described are designated by the same reference characters having a prime added thereto. In the form of the invention illustrated in this figure the typewriter is shown as having only one space bar 6', this space bar being operative for effecting a double spacing by means of the withdrawal of the stop 17' which controls the amount of movement of the release pawl 14'. In using a typewriter of the construction shown in this figure, where a double space is desired at any time, the typing is completed in the usual way and the space bar is then depressed. If the space bar is depressed simultaneously with the printing of the last character, the carriage C, upon the release of the type bar and the space bar, moves to such a position that the next character printed will be one full space away from the last character printed. For example, in printing ordinary words, the space bar 6' will be depressed simultaneously with the striking of the key for the last letter of a word so that the carriage will automatically assume a position ready for the starting of the next word. This saves the time heretofore required for a separate operation of the space bar. Between sentences where a double space may be desired, the period key will be depressed in the usual manner and thereafter the space bar will be operated.

In Figures 8 to 11, both inclusive, there is illustrated a supplemental escapement mechanism. In this figure the rack bar 70, corresponding to the rack bars 7 and 7' heretofore illustrated, is provided with teeth on both its upper and lower surfaces. The teeth on its lower surface are provided for cooperation with a pinion 8 or 8' as heretofore shown, while the teeth on the upper surface are provided for cooperation with a similar pinion 25 suitably keyed to a shaft 26 journalled in and carried by a suitable portion of the carriage C. Mounted on the shaft 26 is a holding escapement wheel 27 and a release escapement wheel 28, the release escapement wheel, as illustrated in Figure 11 being secured to the shaft 26 through the medium of a spring 29, which spring tends normally to rotate the escapement wheel 28 in the direction indicated by the arrow $b$. The holding escapement wheel 27 is secured to the shaft 26 for rotation therewith and is provided with an arcuate slot 30 into which projects the front end of a pin 31 carried by the release escapement wheel 28. Under the influence of the carrier spring the carriage tends normally to move in the direction of the arrow B which would necessitate a rotation of the shaft 26 in the direction indicated by the arrow $b$. Such a rotation is prevented however, by reason of the engagement between one end of the slot 30 and the pin 31. When the space bar 32 is depressed it raises the bar 33 and rocks the double armed pawl in a counter-clockwise direction as viewed in Figure 9 about its pivotal mounting 35. This brings the arm 36 into engagement with one of the teeth of the holding escapement wheel 27, and moves the arm 37 out of engagement with the release escapement wheel 28. Under the influence of the spring 29, the release escapement wheel 28 rotates in the direction indicated by the arrow $b$ throughout the distance permitted by the slot 30, this distance being sufficient to effect a carriage movement of one space as will be hereinafter more fully apparent. During this movement, travel of the carriage is prevented by the engagement between the arm 36 and the holding escapement wheel 27. Upon the release of the space bar 32, however, the spring 38 returns the double armed pawl 34 from the position of Figure 10 to the position shown in Figure 9. This movement releases the holding escapement wheel 27 and effects engagement of the release escapement wheel 28, whereby under the influence of the carriage spring the shaft 26 is free to rotate in the direction indicated by the arrow $b$ throughout the distance permitted by the slot 30. This so positions the carriage that it is ready for the next printing operation.

From the foregoing it becomes apparent that the escapement mechanism just described permits movement of the carriage relatively to the rack bar 70. This rack bar, however, will normally be under the control of an escapement as indicated in Figure 1 of the drawings and effective for releasing the rack bar itself. Thus, where the two escapements are provided, and both escapements are operated simultaneously there is obtained not only the movement of the rack bar but also the movement relative to the rack bar. In a typewriter having space bars 6 and 32, for example, the depression of the space bar 6 would release the rack bar for movement through two spaces. The operation of the space bar 32 would be effective by itself of obtaining a single space. If the space bar 6 and the space bar 32, therefore, were simultaneously depressed, the carriage would move a distance equal to three spaces. Under certain conditions of operation this might be desirable as it would enable an operator at the conclusion of a sentence to depress the period key, the space bar 6 and the space bar 32 simultaneously. The simultaneous depression of the period key and the space bar 6 would result in the printing of a period and the double spacing of the carriage beyond the period, and the depression of the key 32 would result in still another space, so that at a single time an operator is enabled to complete the punctuation at the end of a sentence, and provide a triple space ready for the start of a new sentence. In this manner the time usually required for a double operation of the space bar after the printing of the period is saved. Since the pawl 34 has only sliding contact with the bar 33, the desired operative position of these parts is always maintained irrespective of the position of the carriage.

In Figure 12, there is illustrated a slightly modified embodiment of the invention in which the key bars 40, corresponding to the key levers 4 and 4', heretofore shown, are each composed of two parts having a pivotal connection 41, the parts being connected by a tension spring 42 of such strength that normal operation of a key will result in the usual operation of its type bar. The normal movement of the type bar is such as to just bring it into engagement with a stop 43. If movement of the key is continued beyond this point, it will be effective for engaging the space bar 44 for depressing the same. This continued movement of the key lever, or that portion thereof which carries the key, is permitted by reason of the spring 42. With a construction of this character, the space bar 44 will correspond to the space bar 6 so that depression of a key far enough to actuate the space bar will effect not only a printing operation but a spacing operation. In ordinary writing, for example, the last letter of each word would be formed by continuing the movement of the key to an extent not only to effect printing of the character but to engage the space bar 44 for withdrawing the stop 17 so as to obtain not only a printing operation but a spacing operation. It will be apparent that, if desired, the space bar 44 may correspond to the space bar 32. In either case, both a printing and a spacing operation will be simultaneously obtained.

In Figure 13 of the drawings, there is illustrated a double or twin keyboard installation in which all of the keys designated K in the left hand group are adapted to print to the left of the printing line PL while all of the keys K' of the right hand group are adapted to print to the right of the printing line PL. Each of the keys will be of usual construction as hereinbefore described, whereby each key will result in a single spacing operation. With such a construction an entire document could be written by the use of only the keys K, or an entire document could be written by the use only of the keys K'. Each group of keys, however, will preferably control a separate escapement mechanism. I have found it desirable to have the keys K control an escapement mechanism similar to that shown in Figures 8 to 11 of the drawings and the keys K' control an escapement mechanism similar to that shown in Figures 4 to 7 of the drawings. Either or both of the groups of keys may have any desired arrangement of space bars. In the form of the invention shown, the group of keys K is shown as having a space bar 32 while the group of keys K' is shown as having space bars 5 and 6.

With the construction of the character just described, one character in each keyboard may be depressed simultaneously. In writing the word "he" for example, the "h" in the left hand key board and the "e" in the right hand keyboard could be simultaneously depressed. At the same time, the space bar 6 could be depressed so that at a single operation the letters of the word would both be printed and a space obtained ready for the commencement of the following word. This is true for the reason that the action of the escapement is supplementary and the movement effected by one in nowise modifies the movement effected by the other.

Since the carriage moves relative to the rack bar 70, this bar is somewhat longer than the ordinary bar, and, as indicated in Figure 3, extends beyond the frame of the machine.

In Figure 14 there is illustrated still another arrangement of space bars for the keyboard of Figure 13. In this figure the space bar 6a corresponding to the space bar 6, before described, is extended entirely across the keyboard, or across a substantial portion thereof so as to be convenient to both groups of keys.

Figure 15 illustrates the preferred spacing lever arrangement used on the left hand keyboard K of the machine shown in Fig. 13. A universal bar 45 is connected to the bar 33 which is effective for actuating the spacing mechanism (Fig. 8). Each key lever 46 is preferably provided with an extension foot 47 adapted to engage the universal bar 45. The space bar 32, attached to a lever 48 which also engages the bar 45, is normally held in a raised position against a stop 48a, by a suitable spring 49 engaging the lever 48. It will thus be seen that a depression of any key on the keyboard K of Fig. 13 results in a single spacing of the carriage without any operating of the space bar 32, since the extension foot 47 actuates the bar 45 while the spring 49 maintains the space bar 32 motionless. This construction requires a minimum of parts and provides that the keys K and bar 32 control the same spacing mechanism without interference.

Certain advantages of the present invention arise from the provision of an escapement mechanism adaptable to standard or special typewriter installations and effective for obtaining double spacing or the simultaneous printing of a character and a spacing operation, in addition to that effected by the printing itself.

Other advantages of the invention arise from the provision of a typewriter having a plurality of escapements so arranged that the action of one is supplemental to the action of the other.

Still other advantages of the present invention arise from the provision of a typewriter of such construction that a plurality of characters may be simultaneously printed, a plurality of different spacing operations simultaneously obtained, or whereby a combination of these two conditions may be obtained.

Still other advantages of the invention arise from the provision of a typewriter of such nature that the time ordinarily required for a spacing operation is conserved.

Still further advantages arise from the provision of a twin or duplex typewriter in which the keys of each keyboard normally produce a single space whereby either keyboard may be used to the exclusion of the other, together with means whereby the simultaneous printing of two characters effects a double spacing operation supplemented by further spacing operation may be simultaneously obtained.

I claim:

1. In a typewriter, a carriage, an escapement mechanism for letter spacing the carriage, means for operating said mechanism to produce relative movement between the carriage and mechanism, and a separate letter spacing escapement mechanism movable with the carriage.

2. In a typewriter, a carriage, a keyboard, a rack bar movable to bring the carriage to different printing positions, means controlling the movement of the rack bar, and a separate means movable relatively to the rack bar for effecting movement of the carriage relatively to the rack bar and to different printing positions, and means operable from said keyboard for controlling both of said means.

3. In a typewriter, a carriage, a keyboard, a rack bar constituting part of said carriage, and movable relatively thereto for producing spacing, an escapement controlling relative movement between the carriage and said rack bar, and means for operating said escapement from said keyboard.

4. In a typewriter, a carriage, a keyboard, a rack bar constituting part of said carriage and movable relative to the carriage for letter spacing, an escapement mechanism controlling relative movement between the carriage and said rack bar, a second escapement mechanism controlling movement of the rack bar, and means operable from said keyboard for controlling both of said escapements.

5. In a typewriter, an escapement mechanism normally operative to produce a single spacing operation, means causing said mechanism to produce a double spacing operation, a second escapement mechanism supplemental to said first mentioned escapement mechanism, and operative with all of the parts of said first mentioned escapement mechanism in stationary position for producing a supplemental escapement movement, and means for simultaneously or individually operating said escapement mechanisms.

6. In a typewriter, a plurality of keyboards each having sets of type bars having adjacent printing points separated a letter space distance, an escapement mechanism under the control of one of the keyboards, a second independent escapement mechanism under the control of another of the keyboards, and operating connections between each set of type bars and its corresponding escapement mechanism whereby the operation of any type bar produces a spacing operation.

7. In a typewriter, a plurality of keyboards each having sets of type bars having adjacent printing points separated a letter space distance, an escapement mechanism under the control of one of the keyboards, a second escapement mechanism under the control of another of the keyboards, and operating connections between each set of type bars and its corresponding escapement mechanism whereby the operation of any type bar produces a spacing operation, said escapement mechanism being structurally independent one of the other whereby simultaneous operation of a type bar in each keyboard is permitted.

8. In a typewriter, a plurality of keyboards each having sets of type bars having adjacent printing points separated letter space distances, an escapement mechanism under the control of one of the keyboards, a second escapement mechanism under the control of another of the keyboards, and operating connections between each set of type bars and its corresponding escapement mechanism whereby the operation of any type bar produces a spacing operation, said escapement mechanisms being structurally independent one of the other whereby simultaneous operation of a type bar in each keyboard is permitted, and other means in at least one of said keyboards effective for increasing the space produced by one of the type bars therein.

9. In a typewriter, a carriage, a first escapement mechanism having distinctive operating connections with said carriage, a second escapement mechanism having separate distinctive operating connections to said carriage, each of said escapement mechanisms being effective for letter spacing the carriage, and a plurality of space bars for operating said escapement mechanisms with two space bars cooperating with one escapement mechanism and a third space bar cooperating with another escapement mechanism, said space bars being selectively operable to obtain a movement of the carriage equivalent to one or more spaces.

10. In a typewriter, a carriage, a plurality of individually operable escapement mechanisms for letter spacing the carriage, and a plurality of space bars, said space bars being operatively connected with the escapement mechanisms, one of the escapement mechanisms having an escapement wheel bodily movable with the carriage.

11. In a typewriter, a carriage, a keyboard, an escapement mechanism for letter spacing the carriage, means for operating said mechanism to produce relative movement between the carriage and mechanism, and a separate letter spacing escapement mechanism movable with the carriage, said mechanisms being individually and simultaneously operable from said keyboard.

12. In a typewriter, a plurality of keyboards, a separate escapement mechanism under the control of each of said keyboards, each escapement mechanism being effective upon the operation of any one of the keys operatively connected thereto for producing a single spacing operation, said escapement mechanisms being simultaneously operable by the depression of a key in each keyboard to produce a double spacing, and means in one of said keyboards effective for increasing the spacing normally produced by one of the keys therein.

13. In a typewriter, a platen, a plurality of keyboards each having sets of type bars having adjacent printing points separated a letter space distance adapted for simultaneous printing on said platen of adjacent characters of a common group on opposite sides of a given line, an individual escapement mechanism for one keyboard, and a second individual escapement mechanism for the other keyboard, said escapement mechanisms being operative for letter spacing the platen and enabling simultaneous printing by both keyboards or individual printing by either keyboard to the exclusion of the other.

14. In a typewriter, a platen, a plurality of keyboards each having sets of type bars having adjacent printing points separated a letter space distance adapted for simultaneous printing on said platen of adjacent characters of a common group on opposite sides of a given line, an individual escapement mechanism for one keyboard, a second individual escapement mechanism for the other keyboard, said escapement mechanisms being operative for letter spacing the platen and enabling simultaneous printing by both keyboards or individual printing by either keyboard to the exclusion of the other, and other means cooperating with one of said mechanisms for supplementing the spacing effected thereby.

15. In a typewriter, a plurality of keyboards, each having type sets, two escapement mechanisms, a platen common to said type sets and receiving distinct letter space movement from each of said mechanisms, and connections between the keys of each keyboard and its respective mechanism for effecting a carriage or letter space movement of the platen.

16. In a typewriter, a plurality of individually or jointly operable keyboards, and a separate escapement mechanism under the control of each of said keyboards, one of said escapement mechanisms being effective upon the operation of any one of the keys in one keyboard for producing a single letter spacing operation, the other of said mechanisms being effective upon operation of any one of the keys in the other keyboard for producing a single letter spacing operation and both of said escapement mechanisms being effective upon the operation of each keyboard for producing a double letter spacing operation.

17. In a typewriter, a carriage, including a rack bar having teeth thereon, an escapement mechanism cooperating with certain of said teeth for controlling the letter spacing movement of the carriage, a second escapement mechanism cooperating with certain other of said teeth for controlling the letter spacing movement of the carriage, and means for operating either of said mechanisms at will.

18. In a typewriter, a carriage including a rack bar having teeth thereon and movable relative to the carriage, an escapement mechanism cooperating with certain of said teeth for controlling relative movement between the rack bar and carriage, a second escapement mechanism cooperating with other of said teeth for controlling simultaneous movement of the rack bar and carriage, and means for controlling both of said mechanisms.

19. In a typewriter, a carriage, a rack bar having two sets of teeth thereon for letter spacing the carriage, an escapement mechanism cooperating at all times with one of said sets of teeth, an escapement mechanism cooperating at all times with another of said sets of teeth, and means controlling the operation of either of said escapement mechanisms at will.

In testimony whereof I have hereunto set my hand.

PATRICK W. SHIELDS.